Feb. 13, 1951   V. WEBER ET AL   2,541,314
TEMPERATURE REGULATING DEVICE
Filed Oct. 27, 1948   4 Sheets-Sheet 1

INVENTORS.
VICTOR WEBER, &
WILLIAM S. KUNZLER.
BY Albert J. Henderson
their ATTORNEY.

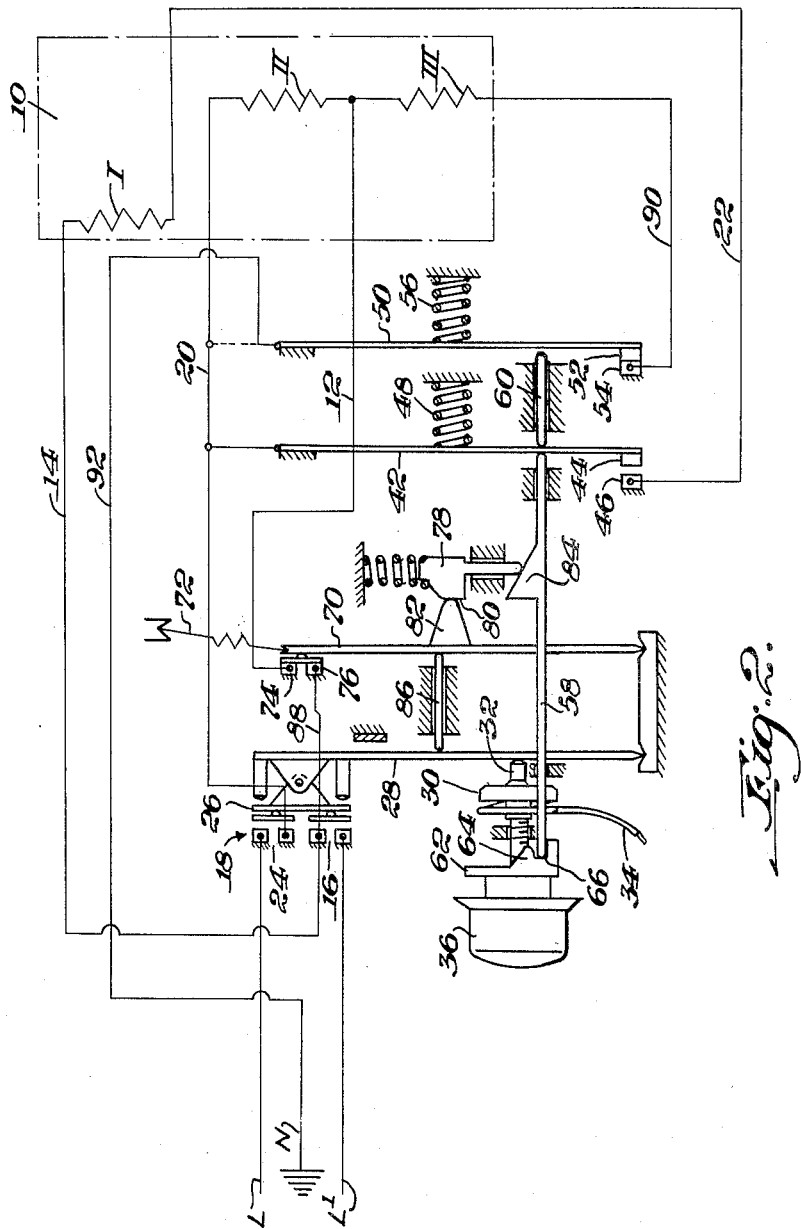

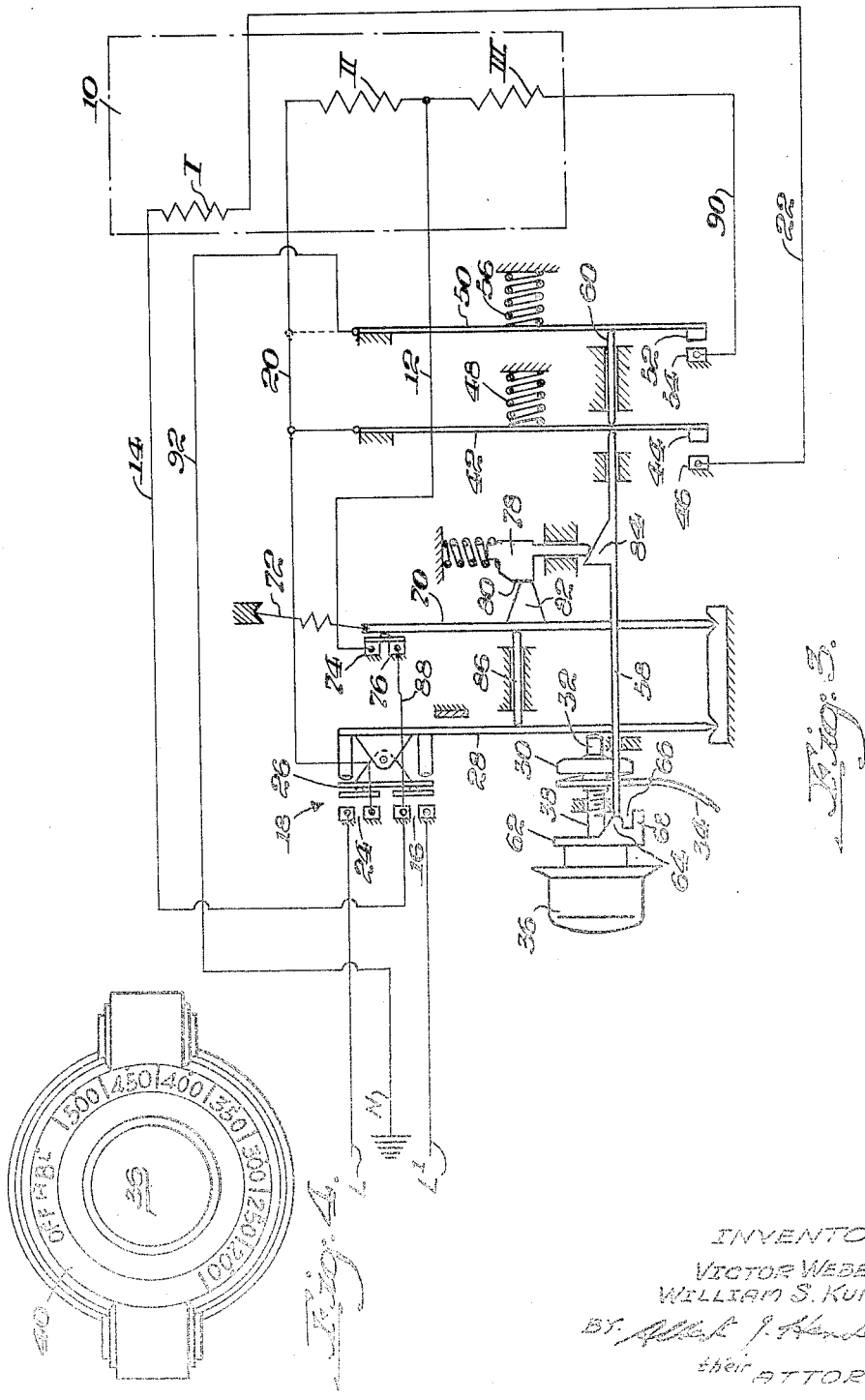

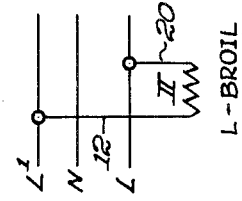
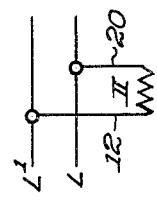
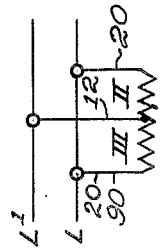
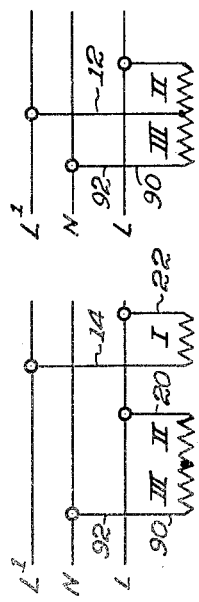
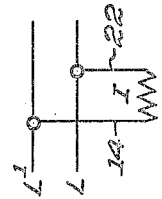
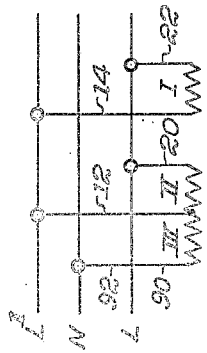
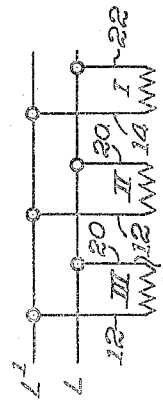

Patented Feb. 13, 1951

2,541,314

UNITED STATES PATENT OFFICE 2,541,314

TEMPERATURE REGULATING DEVICE

Victor Weber and William S. Kunzler, Greensburg, Pa., assignors to Robertshaw-Fulton Controls Company, Youngwood, Pa., a corporation of Delaware Application October 27, 1948, Serial No. 56,754

5 Claims. (Cl. 219—20)

This invention relates to temperature regulating and control devices for electric heating means and, more particularly, to thermostatic controls for domestic electric ovens and ranges.

In Patents Nos. 2,385,433 and 2,385,434, an arrangement for regulating upper and lower electrical heating units in an oven is disclosed as providing a preheating operation followed by an automatic change-over to a baking operation. A broiling operation can be conducted by rotating the thermostat handle to its highest position for energizing the upper heating unit alone. However, in some cases, it is desirable to provide for more than the single broiling heat which the patented devices supplied.

An object of this invention is to permit the upper heating unit to be operated in such a manner as to generate different degrees of heat.

Another object of the invention is to produce such different heats upon operation of the thermostat handle from one position to another.

Another object of the invention is to maintain the upper heating unit under thermostatic control in all heating operations thereof.

Another object of the invention is to retain the automatic change from preheat to baking circuit arrangement while adding the improved broiling arrangement.

Another object of the invention is to obtain the desired improvement without substantial change or additional cost of manufacture of the prior patented control device.

Other objects and advantages will become apparent from the following description taken in connection with the accompanying drawings wherein:

Fig. 2 is a schematic view similar to Fig. 1 but showing the parts in another position of operation;

Fig. 3 is a schematic view similar to Figs. 1 and 2 but showing the parts in still another position of operation;

Fig. 4 is a front-view of the control handle and dial for the control device shown in Figs. 1 to 3 inclusive;

Figure 1:
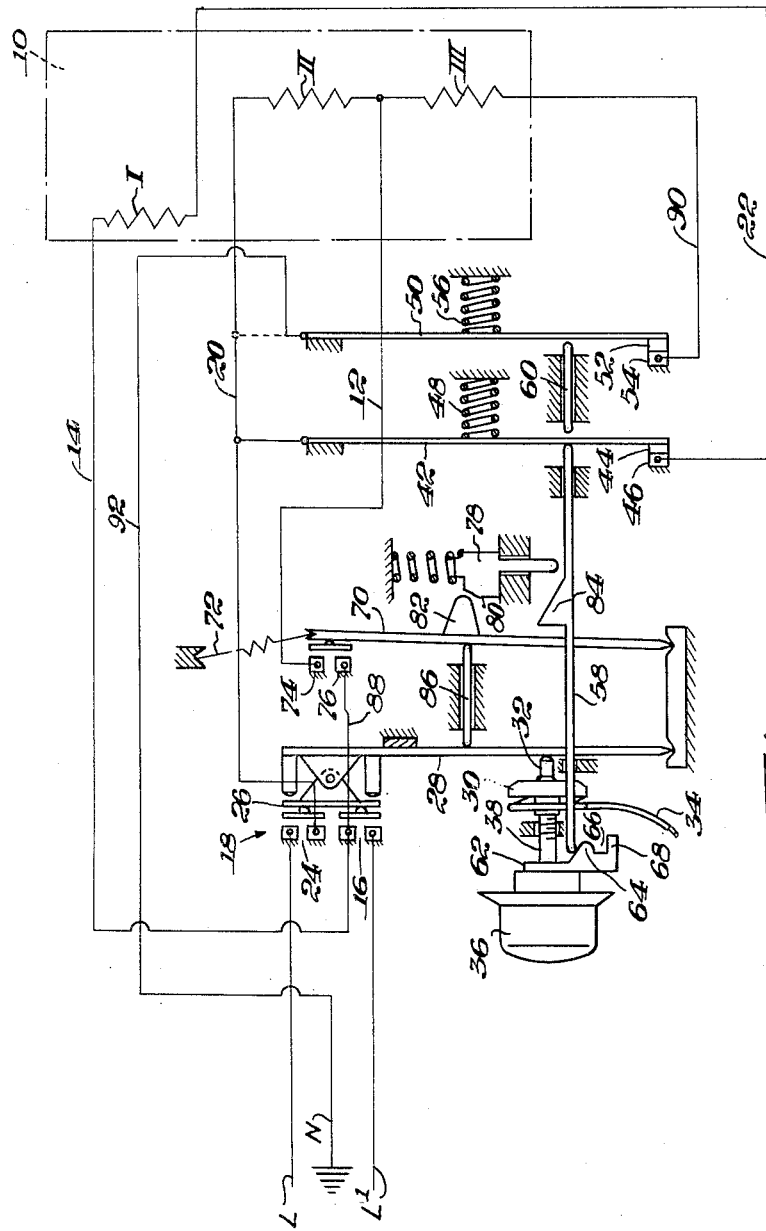
Fig. 1 is a schematic view of an electric oven heating system embodying upper and lower heating units and including the improved control device.

Figs. 5 to 8 inclusive are wiring diagrams showing the electric circuits for different cooking operations, and Figs. 5a to 8a inclusive are wiring diagrams of modified electric circuits for the different cooking operations.

Referring more particularly to the drawings, Figs. 1 to 3 inclusive, an electric heating system for an oven 10 includes a lower heating unit I and a multipart upper heating unit shown as comprising two heating units II and III. The units I-III inclusive are connected to line wires $L^1$ and L of a power source through a double pole switch 18 although other switches to be described are included in the circuits. Thus, one end of the heating unit I is connected by wire 14 to one pole 16 of the switch 18 and the opposite end of this unit I is connected by wires 22 and 20 to the other pole 24 of the switch 18. The units II and III are connected by a common wire 12 to the pole 16 of switch 18 while the wire 20 completes the circuit for unit II through the pole 24. The unit III, however, has its circuit completed by wires 90, 92 which are connected to a neutral line wire N of a three wire system disclosed in Figs. 1 to 3 and the wiring diagrams Figs. 5 to 8 inclusive. However, the invention is not limited to such a source of energy as a two-wire source can be employed, as will hereinafter be apparent.

The switch 18 thus forms a common switching mechanism for the heating units I-III inclusive and is adapted for thermostatic operation. A movable contact bar 26 for cooperation with the poles 16, 24 is shown as carried on a pivoted switch arm 28. As fully disclosed in the previously mentioned patents, the switch arm 28 may be adapted for snap-action with the contact bar 26 biased to closed switch position. The thermal element of the thermostat mechanism may comprise a diaphragm 30 having a stud 32 engageable with the switch arm 28 and having a capillary tube 34 connected at one end to the diaphragm 30 and at the opposite end to the usual bulb (not shown) located to respond to the temperature prevailing in the oven 10. An expansible liquid completely fills the thermal element including the capillary tube 34 and diaphragm 30 so that expansion and contraction of the diaphragm 30 will result from changes in temperature as well understood by those skilled in the art.

Adjustment of the stud 32 relative to the switch arm 28 is conducted by rotation of a thermostat handle 36 which changes the position of a screw 38 engageable with the diaphragm 30. As shown more clearly in Fig. 4, the handle 36 carries a dial 40, having temperature indicia or graduations marked thereon.

As previously indicated, the improved structure provides for a plurality of heats from the upper heating units II and III it being apparent that the latter may dissipate less voltage than part II. To this end, the dial 40 not only carries the usual temperature indicia, but also a broil position marked "B" having subdivisions "H" and "L" for high and low broil positions respectively. The broil position "B" marks the limit of rotation beyond the high temperature graduation 500° F., as shown in Fig. 4, such position being reached by clockwise rotation of the handle 36 from the position marked "off" on the dial. This rotation of the handle 36 for adjusting the thermostat throughout the entire operating range moves the expansible diaphragm 30 back and forth relative to the switch arm 28. When the dial is turned to the "off" position, the switch arm 28 is held against its bias in such position that the contact bar 26 is in open contact position. Thus, both sides of the line $L^1$, L are broken for deenergizing the upper and lower heating units I, II and III.

The lower heating unit I is adapted to be controlled by another means in addition to the common switch mechanism 18 associated with the thermostat. Thus, a first switch arm 42 carrying a movable contact 44 for cooperation with a fixed contact 46 is interposed in the wire 22 for opening and closing the circuit therethrough when the contacts 44, 46 are in open position. Suitable means for biasing the switch arm 42 for closing the contacts 44, 46 is employed and may take the form of a coil spring 48 operative between the switch arm 42 and a fixed portion of the control device as indicated schematically in the drawings.

Similarly, the part III of the upper heating unit is also under control of means other than the common switch mechanism 18 and, in this instance, a second switch arm 50 carrying a movable contact 52 for cooperation with a fixed contact 54 is employed for opening and closing the circuit to the part III and has the contacts 52, 54 biased to closed position by a coil spring 56 similar in all respects to the coil spring 48.

Operation of the first and second switch arms 42, 50 respectively, is conducted by switch operating means which project between the first and second switch arms 42, 50 and the control handle 36. In this embodiment, the switch operating means comprise a main switch operating bar 58 between the control handle 36 and the first switch arm 42 and an auxiliary switch operating bar 60 extending between the first and second switch arms 42, 50 respectively. It should be observed that the length of the auxiliary switch operating bar 60 is less than the distance between the fixed contacts 46, 54 for sequential closure of the contacts 44, 46 and 52, 54 as will hereinafter be explained. The operating bars 58, 60 are suitably supported for slidable movement relative to the fixed portion of the control device as indicated in the drawings.

The end of the main switch operating bar 58 adjacent the handle 36 is engageable by a cam element 62 which is rotatable with the handle 36. The cam element 62 includes a raised portion 64 which adjoins on one side a recess 66 within which the bar 58 is adapted to be received. The opposite wall of the recess 66 forms a stop element 68 beyond which further rotation of the handle 36 cannot occur. Thus, the recess 66 is located opposite the "H" position on the dial 40 while the raised portion 64 of the cam element 62 is located opposite the "L" position on the dial 40.

The structure includes the usual broil switch means as disclosed in the previously mentioned patents. In this embodiment, the broil switch is shown schematically in the form of a third switch arm 70 positioned intermediate the common switch arm 28 and the first switch arm 42 and being pivoted at one end. The opposite end of the third switch arm 70 is shown as engaged by a toggle spring 72 which serves to retain the third switch arm 70 in either of two positions to which it may be moved. A pair of fixed contacts 74, 76 interposed in the wire 12 are adapted to cooperate with the third switch arm 70 to open and close a circuit through the wire 12. As this wire 12 is common to both parts of the multipart upper heating unit II, III, it is apparent that the circuit of these parts is controlled by operation of the third switch arm 70.

Means for latching the third switch arm 70 in a position for maintaining the contacts 74, 76 closed is provided and takes the form of a yieldably mounted latching element 78 movable between latching positions substantially parallel with the third switch arm 70. The latching element 78 has an operating face 80 engageable with an abutment 82 carried by the third switch arm 70. Movement of the operating face 80 longitudinally into and out of engagement with the abutment 82 is effected by a projection 84 carried on the main switch operating bar 58 and movable transversely therewith into and out of engagement with the latching element 78.

The arrangement thus schematically shown and described is such that when the operating bar 58 is disengaged from the raised portion 64 or the recess 66 in the cam element 62, then the projection 84 thereon will be disengaged from the latching element 78 and the latter will assume a position out of engagement with the abutment 82 due to its yieldable mounting. It will be apparent that the operating bars 58, 60 are shown as biased to the left as viewed in the drawings, Figs. 1 to 3 inclusive, due to the coil springs 48, 56 exerting such bias on the first and second switch arms 42, 50 respectively, as previously described.

In order that the third switch arm 70 may be moved to a position to open the contacts 74, 76 when the latching element 78 is ineffective as described, a connection between the third switch arm 70 and the common switch arm 28 is provided. Such connection is indicated in the drawings as comprising a sliding pin 86 extending between the common switch arm 28 and the third switch arm 70 for the purpose described. It will be understood that when the latching element 78 is in latching position as shown in Figs. 2 and 3 of the drawings that the sliding pin 86 is prevented from causing movement of the third switch arm 70 to open the contacts 74, 76 even if the common switch arm 28 moves to a position which would otherwise cause such contact opening movement.

In the operation of the structure described and shown herein, a pre-heating, a baking and a plurality of broiling operations can be conducted by merely manipulating the handle 36 of the thermostat. The pre-heating operation will rapidly bring the oven 10 to the desired temperature prior to baking and a circuit according to the diagram, Fig. 5, will be established initially until the thermostat operates to automatically establish the circuit shown in the diagram, Fig. 6. Thus, the handle 36 is first rotated to the broil position either "H" or "B" as shown on the dial 40 and then immediately reversely rotated to the desired baking temperature setting. During the initial operation of the handle 36, the cam element 62 will rotate with the handle 36 to bring the raised portion of the cam element 62 into engagement with the adjacent end of the main switch operating bar 58 causing the latter to move to the right as viewed in the drawing Fig. 1. Such movement of the bar 58 causes the projection 84 to become engaged with the latching element 78 which raises the operating face 80 thereof into engagement with the abutment 82 of the third switch arm 70. The bias of the toggle spring 72 is thereby overcome and the pivotal movement of the third switch arm 70 causes closure of the contacts 74, 76.

As indicated on the diagram, Fig. 5, the preheat circuit includes both parts II and III of the multipart upper heating element and may be traced from line wire $L^1$ pole 16 of the double-pole common switch mechanism 26, wire 88, fixed contact 76, fixed contact 74, wire 12, part II of the upper heating element, wire 20, terminal 24 and line wire L. As the operating bars 58 and 60 are holding the switch arms 42 and 50 in a position to open their respective contacts 44, 46 and 52, 54, neither the part III of the upper heating unit nor the lower heating unit I can become energized during this initial operation of the dial 40 to the broil position. However, upon reverse rotation of the dial 40 to the desired baking temperature setting, the operating bars 58 and 60 return to the position shown in Fig. 1 due to removal of the raised portion 64 of the cam element 62 from engagement with the operating bar 58. A circuit for the part III of the upper heating unit is then established and may be traced as follows: line wire $L^1$, pole 16, wire 88, contacts 76, 74, wire 12, part III, wire 90, contacts 54, 52, switch arm 50 and wire 92 to the neutral line wire N. Part II of the upper heating unit is thus connected at full voltage while part III of the upper heating unit is connected at reduced voltage. The lower heating unit I is also energized through a circuit which may be traced as follows: line wire $L^1$, pole 16, wire 14, unit I, wire 22, contacts 46, 44, switch arm 42, wire 20, pole 24 and line wire L. The lower heating unit I is therefore energized at full voltage during the preheat operation.

The contact bar 26 of the common switch mechanism 18 will remain in engagement with the poles 16 and 24 until the diaphragm 30 of the thermal element expands sufficiently to operate the switch arm 28 at the desired temperature setting. Movement of the switch arm 28 in a clockwise direction about its pivot will serve to move the sliding pin 86 to the right as viewed in the drawing and operate the third switch arm 70 to open the contacts 74, 76 of the broil switch. The parts are now positioned as shown in Fig. 1 and the circuit is conditioned for a baking operation as soon as the temperature in the oven 10 drops sufficiently to cause contraction of the diaphragm 30 and consequent closure of the common switch mechanism 18 by operation of the contact bar 26. Upon such drop in temperature, the circuit shown in Fig. 6 is established due to the third switch arm 70 of the broil switch remaining disengaged from the contacts 74, 76 by operation of the toggle spring 72. The lower heating unit I remains connected across the line wires $L^1$, L while the upper heating unit parts II, III are now connected in series across the neutral line N and the line wire L. Consequently, during the ensuing bake operation the lower heating unit is operated at full voltage and the upper unit at reduced voltage.

To conduct a broiling operation at the highest temperature, the dial 40 is rotated to the "H" position which will serve to position the parts as shown in Fig. 2. In reaching this dial position, the operating bar 58 rides over the raised portion 64 of the cam element 62 and drops into the recess 66. The operating bar 58 is thus positioned for maintaining the first switch arm 42 in a position for holding the contacts 44, 46 in open position but due to the spacing of the fixed contacts 46, 54, the auxiliary contact bar 60 is ineffective for holding the second switch arm 50 in a position for opening the contacts 52, 54. Consequently, the circuit of the lower heating unit I is not established but the circuits for both parts II, III of the upper heating unit are established by closure of the contacts 52, 54. Moreover, the projection 84 is positioned for overcoming the bias of the latching element 78 causing the operating face 80 thereof to engage the abutment 82 on the third switch arm 70 for closing operation of the contacts 74, 76. The circuit shown in Fig. 7 is thus established upon closure of the common switch mechanism 18 by operation of the contact bar 26 upon thermostatic control and it will be observed that both parts II, III of the upper heating unit are energized in this circuit, that is, with part II at full voltage and part III at reduced voltage.

A broiling operation at a lower temperature can be conducted by rotating the dial 40 to the position marked "L" thereon. Such rotation will cause the raised portion 64 of the cam element 62 to be positioned in engagement with the main operating bar 58 as shown in Fig. 3. Due to the resultant movement to the right of the main contact bar 58, as viewed in Fig. 3, the auxiliary contact bar 60 is moved to the right sufficiently to open the contacts 52, 54 by causing pivotal movement of the second switch arm 50. Consequently, the circuit through part III of the upper heating unit is discontinued in this low broil position. The circuit shown in the diagram Fig. 8 is established through part II of the upper heating unit which is connected at full voltage across the lines $L^1$, L.

The invention is not limited to the use of a three-wire source of power but can be modified for use with a two-wire source if desired. Such modification can be made by eliminating wire 92 and connecting the second switch arm 50 directly to the wire 20 as shown in broken lines in Figs. 1, 2 and 3. Thus, as shown on the diagrams, Figs. 5a to 8a inclusive, respectively, the preheat arrangement has the units I, II and III connected in parallel across the line wires $L^1$, L, the bake arrangement has element I only connected across the line wires $L^1$, L, the "H" broil arrangement has the elements II and III connected across the line wires $L^1$, L while the "L" broil arrangement has the part II of the upper heating unit connected across the line wires $L^1$, L. In this embodiment, the part III may dissipate less wattage than part II. It will be observed that in the bake arrangement Fig. 6a, no top heat is supplied as is the case in the three wire arrangement Fig. 6.

It will be understood that the arrangement shown and described herein is schematic only and further details can be had by reference to the patents previously mentioned, although many changes may be made in the details of construc-

We claim:

1. A control device for an electrically heated oven provided with a multipart upper heating unit and a lower heating unit, comprising a first switch arm adapted for controlling said lower heating unit and being biased to a position in which said lower heating unit is adapted to be energized, a second switch arm adapted for controlling at least one part of said upper heating unit and being biased to a position in which said one part of said upper heating unit is adapted to be energized, a control handle having a bake and a plurality of broil positions, main switch operating means projecting between said first switch arm and said control handle and adapted for excess movement beyond that required for operating said first switch arm from said biased position, auxiliary switch operating means projecting between said first and second switch arms and being responsive to said excess movement for operating said second switch arm from said biased position, means movable with said handle into operative engagement with said main switch operating means and being effective for imparting said excess movement for overcoming the bias of both said first and second switch arms in one of said broil positions for deenergizing said lower heating unit and said one part of said upper heating unit, said last means being ineffective in another of said broil positions for imparting said excess movement and overcoming the bias of said first switch arm only for deenergizing said lower heating unit, and means operably associated with said main switch operating means and responsive to operation of said handle to any one of said broil positions for controlling the energization of all parts of said upper heating unit.

2. A control device for an electrically heated oven provided with a multipart upper heating unit and a lower heating unit, comprising a first switch arm adapted for controlling said lower heating unit and being biased to a position in which said lower heating unit is adapted to be energized, a second switch arm adapted for controlling at least one part of said upper heating unit and being biased to a position in which said one part of said upper heating unit is adapted to be energized, a third switch arm adapted for controlling all parts of said upper heating unit, a control handle having a bake and a plurality of broil positions, switch operating means projecting between said first and second switch arms and said control handle, means movable with said handle into operative engagement with said switch operating means for overcoming the bias of both said first and second switch arms in one of said broil positions for deenergizing said lower heating unit and said one part of said upper heating unit, said means being ineffective in another of said broil positions for overcoming the bias of said second switch arm for deenergizing said lower heating unit only, and latching means operatively engageable with said switch operating means in all of said broil positions for operating said third switch arm to a position in which said upper heating unit is adapted to be energized, said latching means being rendered ineffective by movement of said handle to said bake position in which said first switch arm is operated by said operating means for energization of said lower heating unit.

3. A control device as claimed in claim 2 wherein thermostatic means are provided for cooperation with said third switch arm and being effective in said bake position for deenergizing all parts of said upper heating unit.

4. A control device for an electrically heated oven provided with a multipart upper heating unit and a lower heating unit, comprising a first switch arm adapted for controlling said lower heating unit and being biased to a position in which said lower heating unit is adapted to be energized, a second switch arm adapted for controlling at least one part of said upper heating unit and being biased to a position in which said one part of said upper heating unit is adapted to be energized, a control handle having a bake and a plurality of broil positions, main switch operating means projecting from said control handle for operating said first switch arm, auxiliary switch operating means between said first and second switch arms and responsive to sufficient movement of said main switch operating means for operating said second switch arm, a cam element carried by said handle having a plurality of contour surfaces corresponding to said broil positions respectively and adapted for cooperation with said main switch operating means, the arrangement being such that in one of said broil positions said movement is sufficient to overcome the bias of both said first and second switch arms for deenergizing said lower heating unit and said one part of said upper heating unit and being insufficient in another said broil position for causing operation of said auxiliary switch operating means for overcoming the bias of said first switch arm only, and means operably associated with said main switch operating means and responsive to operation of said handle to any one of said broil positions for controlling the energization of all parts of said upper heating unit.

5. A control device for an electrically heated oven provided with a multipart upper heating unit and a lower heating unit, comprising a first switch arm adapted for controlling said lower heating unit and being biased to a position in which said lower heating unit is adapted to be energized, a second switch arm adapted for controlling at least one part of said upper heating unit and being biased to a position in which said one part of said upper heating unit is adapted to be energized, a third switch arm adapted for controlling all parts of said upper heating unit, a control handle having a bake and a plurality of broil positions, main switch operating means projecting between said control handle and said first switch arm, auxiliary switch operating means between said first and second switch arms and responsive to movement of said main switch operating means, a cam element carried by said handle for cooperation with said main and auxiliary switch operating means, the arrangement being such that in one of said broil positions the bias of both said first and second switch arms is overcome for deenergizing said lower heating unit and said one part of said upper heating unit while in another said broil position said main and auxiliary switch operating means are effective for overcoming the bias of said first switch arm only, and latching means operatively engageable with said main switch operating means in all of said broil positions for operating said third switch arm to a position in which said upper heating unit is adapted to be energized, said latching means being rendered ineffective by movement of said handle to said bake position in which said first switch arm is operated by said main switch operating means for energization of said lower heating unit.

VICTOR WEBER.
WILLIAM S. KUNZLER.

REFERENCES CITED

The following references are of record in the file of this patent:

UNITED STATES PATENTS

| Number | Name | Date |
|---|---|---|
| 1,359,889 | Gumaer | Nov. 23, 1920 |
| 1,849,922 | Griswold | Mar. 15, 1932 |
| 2,123,699 | Kahn et al. | July 12, 1938 |
| 2,201,584 | Kahn et al. | May 21, 1940 |
| 2,385,433 | Weber | Sept. 25, 1945 |
| 2,434,467 | McCormick | Jan. 13, 1948 |